April 23, 1929.   J. F. CAILLOUX   1,710,294
FISHING TOOL
Filed July 9, 1927
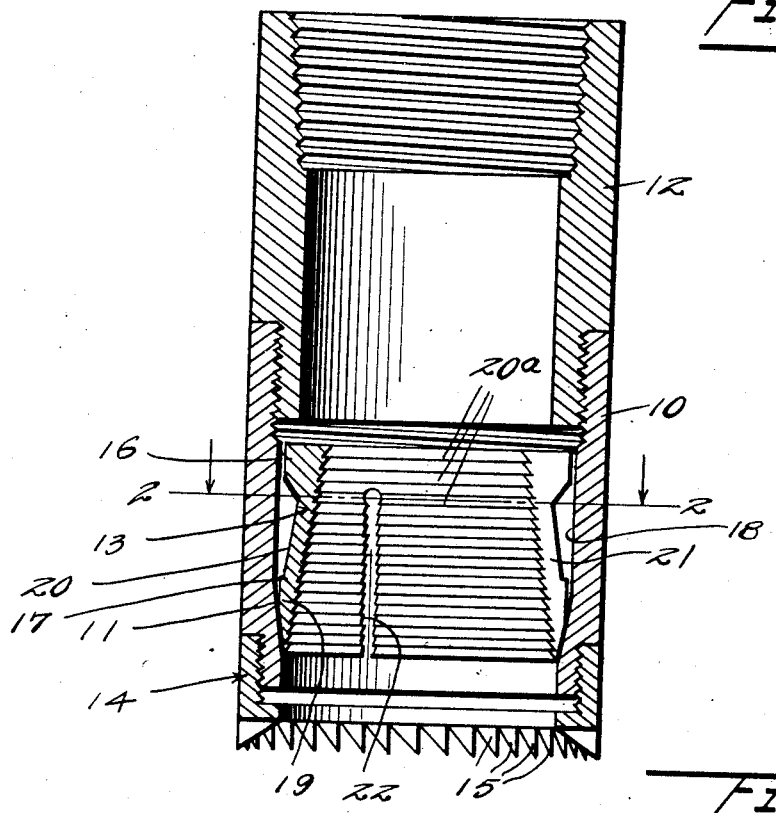
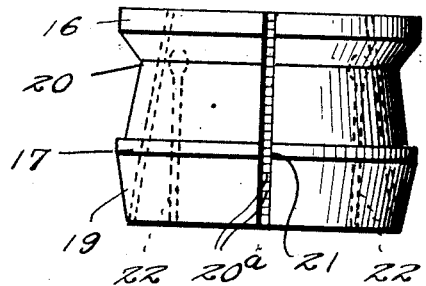
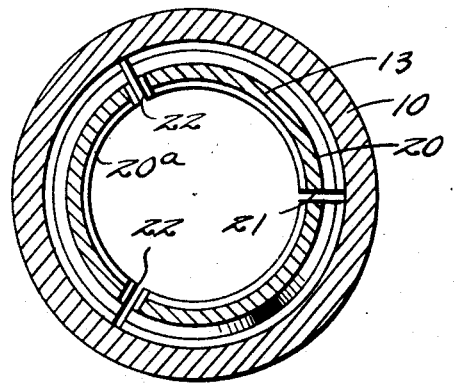
INVENTOR.
J. F. Cailloux
BY
Watson E. Coleman ATTORNEY.

Patented Apr. 23, 1929.

1,710,294

UNITED STATES PATENT OFFICE.

JOHN F. CAILLOUX, OF OKLAHOMA CITY, OKLAHOMA.

FISHING TOOL.

Application filed July 9, 1927. Serial No. 204,523.

This invention relates to fishing tools and more particularly to a device for use in removing from well bottoms small elements such as the rollers of rock bits and the like which often become detached from the tool and must be removed before drilling can proceed.

An important object of the invention is to produce a device of this character capable of use in fishing for devices of this sort which are of different sizes and which will permit the device to be removed where the same is embedded in a layer of mud, dirt or bits of rock which have fallen from the walls of the well.

A further and more specific object of the invention is to provide a slip construction for use in a fishing tool of this character which is especially adapted for the engagement of such articles and which may be very readily and cheaply produced.

These and other objects I attain by the construction shown in the accompanying drawing, wherein for the purpose of illustration is shown a preferred embodiment of my invention and wherein:—

Figure 1 is a vertical sectional view through a fishing tool constructed in accordance with my invention;

Figure 2 is a section on the line 2—2 of Figure 1;

Figure 3 is a side elevation of the slip detached.

Referring now more particularly to the drawing, the numeral 10 generally designates a bowl provided interiorly adjacent its bottom with a downwardly tapering seat 11. This bowl is engaged at its upper end by a head or top 12, which serves both as a coupling for connecting the bowl to a pipe string and as a stop limiting upward movement of a slip 13 arranged within the bowl and coacting with the seat. The slip will hereinafter be more fully described.

At the lower end, the bowl is provided with a combined guide and milling cutter 14 consisting of an annular shoe, the lower face of which inclines upwardly and inwardly and is provided with rock teeth 15. These teeth will cut through rock or soil interfering with the passage of the bowl upon rotation of the bowl and will act to deliver any harder substance such as the roller of a rock bit to the bore of the bowl.

The slip 13 comprises a sleeve having at its upper and adjacent its lower end portions 16 and 17 of slightly less diameter than the bore 18 of the bowl above the seat 11. Below the portion 17, the exterior of the sleeve tapers downwardly, as indicated at 19, with the same taper as that given the seat 11. Between the portions 16 and 17, the exterior of the sleeve is relieved, as at 20, for a purpose presently to appear. The bore of the sleeve tapers upwardly and is provided with upwardly facing ratchet teeth 20.

The sleeve is vertically split at one point, as indicated at 21, and at a plurality of other points is split from its lower end to a point immediately below the upper bore fitting portion 16, as indicated at 22. By splitting the sleeve at 21, the entire sleeve may contract, while the slits 22 form at the lower end of the sleeve a plurality of independently movable portions, the resistance of which to movement is reduced by the relieving of the exterior of the sleeve at 20. The slip 13 is free to rotate in the bowl and it will be obvious that any hard substance which cannot be cut by the cutters 19 and which is directed to the bore of the bowl, will pass upwardly through the slip until it becomes firmly wedged therein, so that when the bowl is lifted, the element will be lifted therewith. This element of its own weight will urge the slip 13 downwardly, so that the independently movable portions formed by the slits 22 may converge and more tightly grip the element.

Since the construction hereinbefore set forth is capable of a certain range of change and modification without materially departing from the spirit of the invention, I do not limit myself to such specific structure except as hereinafter claimed.

I claim:—

1. A fishing tool for removing the cutting elements of rocks drills and the like from well bores comprising a bowl, a rock milling shoe at the lower end of the bowl having an upwardly tapering lower face directing uncuttable articles upwardly through the bore of the bowl and a slip in the bore of the bowl for grasping such articles with a lifting grip derived from the resilience of the slip itself, said slip comprising a relatively thin sleeve having a thickened upper end, said sleeve being vertically split at one end and at a plurality of other points slit from its bottom to a point immediately beneath said thickened portion, the interior of the sleeve having grasping teeth, and being tapered from its lower toward its upper end.

2. A fishing tool for removing the cutting elements of rock drills and the like from well bores comprising a bowl, a rock milling shoe at the lower end of the bowl having an upwardly tapering lower face directing uncuttable articles upwardly through the bore of the bowl and a slip in the bore of the bowl for grasping such articles with a lifting grip derived from the resilience of the slip itself, said slip comprising a relatively thin sleeve having a thickened upper end, said sleeve being vertically split at one point and at a plurality of other points slit from its bottom to a point immediately beneath said thickened portion, the interior of the sleeve having grasping teeth, the exterior of the sleeve at its lower end tapering downwardly, the bowl having a tapered seat for coaction with the downwardly tapering portion of the slip.

3. A fishing tool for removing the cutting elements of rock drills and the like from well bores comprising a bowl, a rock milling shoe at the lower end of the bowl having an upwardly tapering lower face directing uncuttable articles upwardly through the bore of the bowl and a bodily expansible resilient slip in the bore of the bowl for grasping such articles, said slip having an upwardly tapering toothed bore, the teeth of said slip engaging the article with a lifting grip derived from the resiliency of the slip independently of downward movement of the slip in the bore, downward movement of the slip in the bore causing contraction thereof.

In testimony whereof I hereunto affix my signature.

JOHN F. CAILLOUX.